United States Patent
Nakamura et al.

(10) Patent No.: US 8,531,252 B2
(45) Date of Patent: Sep. 10, 2013

(54) ANTENNA DUPLEXER AND COMMUNICATION APPARATUS EMPLOYING THE SAME

(75) Inventors: Hiroyuki Nakamura, Osaka (JP); Tetsuya Tsurunari, Osaka (JP); Joji Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 12/668,699

(22) PCT Filed: Jul. 8, 2008

(86) PCT No.: PCT/JP2008/001815
§ 371 (c)(1),
(2), (4) Date: Jan. 12, 2010

(87) PCT Pub. No.: WO2009/011101
PCT Pub. Date: Jan. 22, 2009

(65) Prior Publication Data
US 2010/0188165 A1    Jul. 29, 2010

(30) Foreign Application Priority Data
Jul. 13, 2007   (JP) ................................. 2007-183962

(51) Int. Cl.
*H03H 9/70* (2006.01)
*H04B 1/48* (2006.01)

(52) U.S. Cl.
USPC ............ 333/133; 333/129; 333/132; 455/82; 455/83; 455/552.1

(58) Field of Classification Search
USPC ................... 333/126, 129, 132, 133; 455/78, 455/82, 83, 552.1
See application file for complete search history.

(56) References Cited

U.S. PATENT DOCUMENTS

| | | | |
|---|---|---|---|
| 5,564,076 A | 10/1996 | Auvray | |
| 6,014,551 A * | 1/2000 | Pesola et al. | 455/86 |
| 6,308,051 B1 * | 10/2001 | Atokawa | 455/78 |
| 6,759,924 B2 * | 7/2004 | Sakuragawa et al. | 333/133 |
| 6,759,925 B2 * | 7/2004 | Satoh et al. | 333/133 |

(Continued)

FOREIGN PATENT DOCUMENTS

| | | | |
|---|---|---|---|
| JP | 7-059162 | | 3/1995 |
| JP | 2003-152590 | * | 5/2003 |

(Continued)

OTHER PUBLICATIONS

T. Metzger et al.; "Selectrion of Micro-Acoustic Technologies for the Realization of Single-ended / Balanced WCDMA Duplexers"; 2008 IEEE MTT-S International Microwave Symposium Digest, Jun. 15-20, 2008, pp. 835-839.*

(Continued)

*Primary Examiner* — Barbara Summons
(74) *Attorney, Agent, or Firm* — Wenderoth, Lind & Ponack, L.L.P.

(57) ABSTRACT

A small antenna duplexer that includes antenna terminal, first filter electrically connected to this antenna terminal and passing a first frequency band, second filter electrically connected to antenna terminal and passing a second frequency band, and third filter electrically connected to antenna terminal and passing a third frequency band. First filter and third filter are used for one band, and second filter and third filter are used for another band.

15 Claims, 9 Drawing Sheets

(56) References Cited

U.S. PATENT DOCUMENTS

| | | | |
|---|---|---|---|
| 7,126,440 B2* | 10/2006 | Bradley et al. | 333/133 |
| 7,162,266 B2* | 1/2007 | Frank | 455/552.1 |
| 7,289,008 B2* | 10/2007 | Kuroki et al. | 333/133 |
| 7,345,400 B2* | 3/2008 | Nakao et al. | 310/313 A |
| 7,446,629 B2* | 11/2008 | Nakamura et al. | 333/133 |
| 2004/0251987 A1 | 12/2004 | Nakamura et al. | |
| 2005/0245201 A1* | 11/2005 | Ella et al. | 455/78 |
| 2005/0245202 A1* | 11/2005 | Ranta et al. | 455/78 |
| 2006/0044080 A1 | 3/2006 | Hagiwara et al. | |
| 2006/0145781 A1* | 7/2006 | Layne et al. | 333/132 |

FOREIGN PATENT DOCUMENTS

| | | |
|---|---|---|
| JP | 2004-166258 | 6/2004 |
| JP | 2004-228666 | 8/2004 |
| JP | 2004-343735 | 12/2004 |
| JP | 2006-203839 | 8/2006 |
| JP | 2006-211057 | 8/2006 |
| JP | 2006-270906 | 10/2006 |
| JP | 2006-310904 | 11/2006 |
| JP | 2006-345027 | 12/2006 |

OTHER PUBLICATIONS

"UMTS frequency bands", From Wikipedia (Reg. Trademark), the free encyclopedia, online at web address http://en.wikipedia.org/wiki/UMTS_frequency_bands, downloaded Jul. 25, 2012, 5 pages.*

International Search Report issued Aug. 26, 2008 in International (PCT) Application No. PCT/JP2008/001815.

* cited by examiner

FIG. 20 – PRIOR ART

ANTENNA DUPLEXER AND COMMUNICATION APPARATUS EMPLOYING THE SAME

This application is a U.S. National Phase Application of PCT International application PCT/JP2008/001815, filed Jul. 8, 2008.

TECHNICAL FIELD

The present invention relates to antenna duplexers used typically in mobile phones, and communications equipment using the antenna duplexer.

BACKGROUND ART

FIG. 20 is a diagram of a conventional communications equipment employing a conventional antenna duplexer. In FIG. 20, the conventional antenna duplexer includes antenna terminal 201, switch 202 electrically connected to this antenna terminal 201 for switching to multiple systems, and first and second antenna duplexers 203 and 204 switched by this switch 202. First antenna duplexer 203 is an antenna duplexer for a first system, and includes transmit filter 203$a$ and receive filter 203$b$. Transmit filter 203$a$ is electrically connected to transmit amplifier 205 and transmit circuit 209A. Receive filter 203$b$ is electrically connected to low-noise amplifier 206 and receive circuit 210A. Second antenna duplexer 204 is an antenna duplexer for a second system, and includes transmit filter 204$a$ and receive filter 204$b$. Transmit filter 204$a$ is electrically connected to transmit amplifier 207 and transmit circuit 209B. Receive filter 204$b$ is electrically connected to low-noise amplifier 208 and receive circuit 210B.

This structure realizes an antenna duplexer that allows the selective use of multiple systems. A prior art related to the present invention is, for example, disclosed in Patent Literature 1.

However, this conventional antenna duplexer is difficult to be downsized. This is because a transmit filter and a receive filter are needed for every system according to the number of selectable systems in the conventional antenna duplexer.

Patent Literature 1: Japanese Patent Unexamined Publication No. 2004-228666

SUMMARY OF THE INVENTION

The present invention achieves downsizing of an antenna duplexer that allows the selective use of multiple bands.

The present invention includes an antenna terminal, a first filter electrically connected to this antenna terminal and passing a first frequency band, a second filter electrically connected to the antenna terminal and passing a second frequency band, and a third filter electrically connected to the antenna terminal and passing a third frequency band. The present invention offers the antenna duplexer that uses the first filter and the third filter for the first band, and the second filter and the third filter for the second band.

This structure enables the use of the third filter for both first band and the second band. Accordingly, at least one filter can be eliminated in line with every increase in the number of selectable bands, contributing to downsizing of antenna duplexer. Furthermore, the present invention achieves downsizing of communications equipment by the shared use of a transmit amplifier and a low-noise amplifier connected to the antenna duplexer between the first band and the second band.

BRIEF DESCRIPTION OF DRAWINGS

FIG. 20 is a diagram of a conventional communications equipment employing a conventional antenna duplexer.

REFERENCE MARKS IN THE DRAWINGS

11. Antenna terminal
12 First filter
13 Second filter
14 Third filter

DETAILED DESCRIPTION OF PREFERRED EMBODIMENTS

First Exemplary Embodiment

An antenna duplexer in the first exemplary embodiment of the present invention is described below with reference to drawings.

Figure 1:
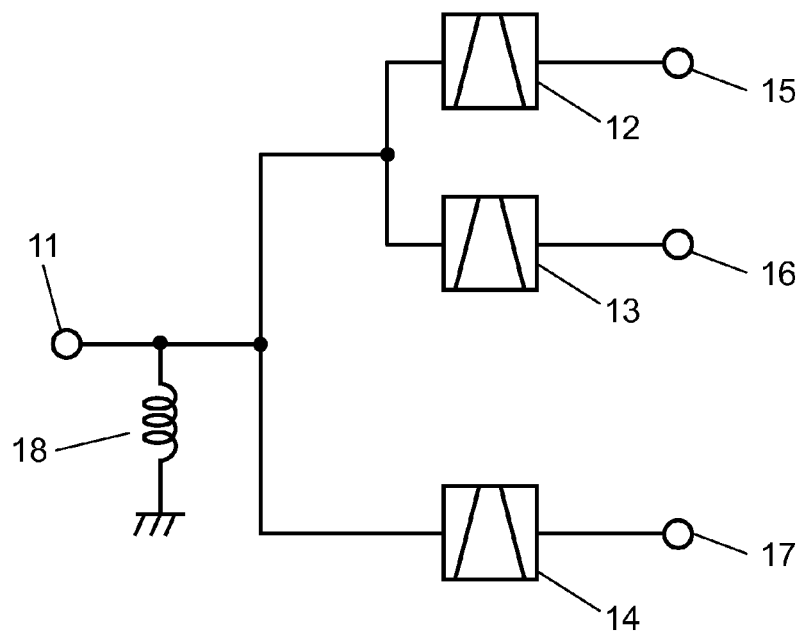
FIG. 1 is a diagram of an antenna duplexer in accordance with a first exemplary embodiment of the present invention.

FIG. 1 is a diagram of the antenna duplexer in the first exemplary embodiment of the present invention. In antenna duplexer in the first exemplary embodiment, shown in FIG. 1, antenna terminal 11, which is connected to an antenna, is connected to first filter 12, second filter 13, and third filter 14. One end of first filter 12 is electrically connected to this antenna terminal 11, and the other end is connected to transmit terminal 15. One end of second filter 13 is electrically connected to this antenna terminal 11, and the other end is connected to transmit terminal 16. One end of third filter 14 is electrically connected to this antenna terminal 11, and the other end is connected to receive terminal 17. Antenna terminal 11 is ground via inductor 18 serving as a matching circuit.

Figure 2:
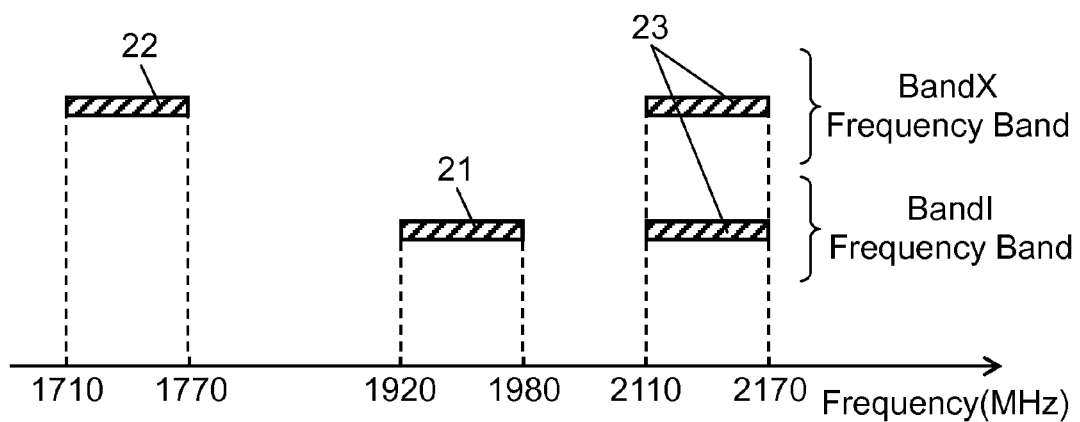
FIG. 2 illustrates frequency characteristics of the antenna duplexer in accordance with the first exemplary embodiment of the present invention.

FIG. 2 illustrates frequency characteristics of the antenna duplexer in the first exemplary embodiment of the present invention. In FIG. 2, a passband of first filter 12 is frequency band 21 (1920 MHz-1980 MHz). A passband of second filter 13 is frequency band 22 (1710 MHz to 1770 MHz). A passband of third filter 14 is frequency band 23 (2110 MHz to 2170 MHz). First filter 12 and third filter 14 are used for one band, and second filter 13 and third filter 14 are used for another band.

In the first exemplary embodiment, frequency band 21 is a transmit frequency band of Band I in UMTS (Universal Mobile Telecommunications System), and first filter 12 is used as a transmit filter for Band I in UMTS. Frequency band 22 is a transmit frequency band of BandX in UMTS, and second filter 13 is used as a transmit filter for BandX in UMTS. Frequency band 23 is a receive frequency band of BandI and BandX in UMTS, and third filter 14 is used as a receive filter for BandI and BandX in UMTS. Single third filter 14 is shared as a receive filter for BandI and a receive filter for BandX that have a common frequency band.

With this structure, compared to a conventional structure, one filter can be omitted in line with every increase in the number of selectable bands. In other words, there is no need to increase both transmit filter and receive filter every time one selectable band is added. In the first exemplary embodiment, the number of selectable bands can be increased by increasing only the transmit filter. As a result, the antenna duplexer can be downsized.

If third filter 14 is used as the transmit filter, a frequency band of third filter 14 is common to a transmit frequency band in the first band and a transmit frequency band in the second band. In this case, the antenna duplexer can suppress transmit interference to other communications equipment by third filter 14.

If third filter 14 is used as a receive filter, as in the first exemplary embodiment, a frequency band of third filter 14 is common to a receive frequency band in the first band and a receive frequency band in the second band. In this case, the antenna duplexer can suppress a receive interference from other communications equipment by third filter 14.

The first exemplary embodiment refers to the antenna duplexer in which the first band is BandI in UMTS, the second band is BandX in UMTS, the first filter is a transmit filter for BandI in UMTS, the second filter is a transmit filter for BandX in UMTS, and the third filter is a receive filter for BandI and BandX in UMTS. However, the antenna duplexer can also be downsized when the first band is BandI in UMTS, the second band is BandIV in UMTS, the first filter is a transmit filter for BandI in UMTS, the second filter is a transmit filter for BandIV in UMTS, and the third filter is a receive filter for BandI and BandIV in UMTS.

Figure 3:
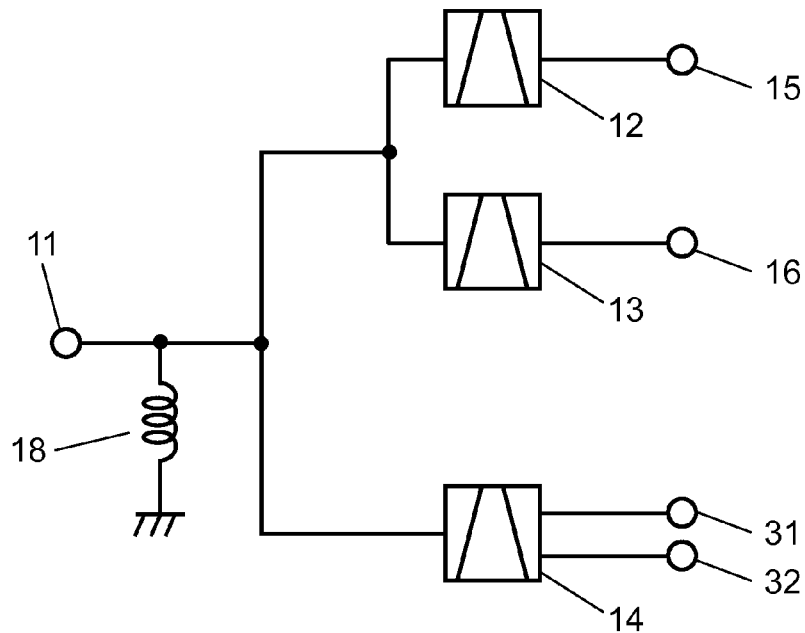
FIG. 3 is a diagram of another antenna duplexer in accordance with the first exemplary embodiment of the present invention.

FIG. 3 is a diagram of another antenna duplexer in the first exemplary embodiment of the present invention. In FIG. 3, the other end of third filter 14 is connected to balanced terminals 31 and 32.

With this structure, a low-noise amplifier with balanced terminal can be connected in a subsequent step after the antenna duplexer. This improves common mode noise rejection of communications equipment.

Figure 4:
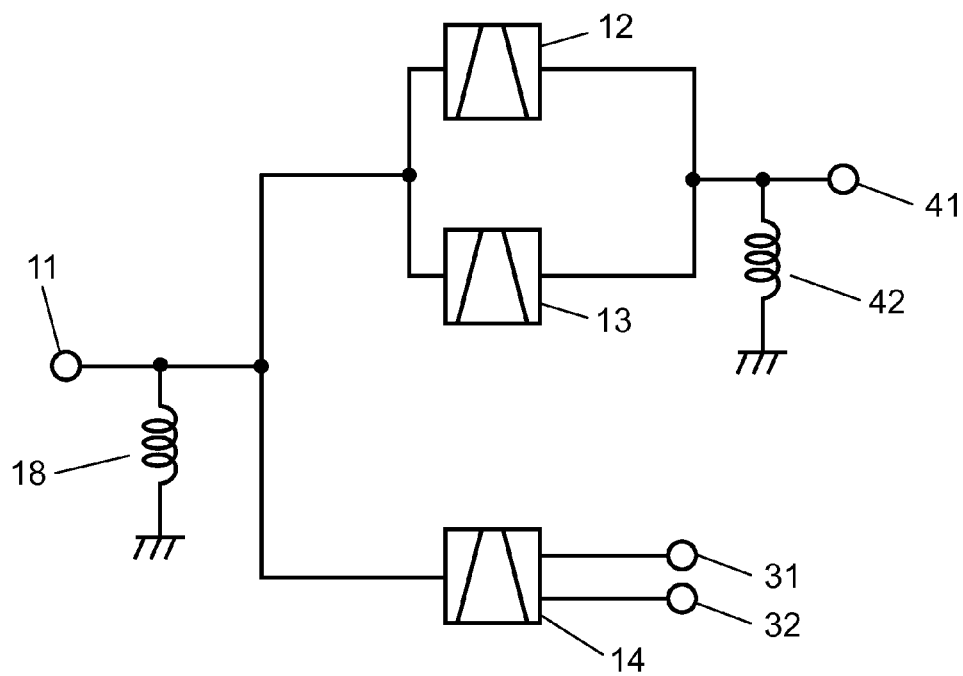
FIG. 4 is a diagram of another antenna duplexer in accordance with the first exemplary embodiment of the present invention.

FIG. 4 is a diagram of still another antenna duplexer in the first exemplary embodiment of the present invention. In FIG. 4, the other ends of first filter 12 and second filter 13 are shared and connected to transmit terminal 41. This transmit terminal 41 is ground via inductor 42 serving as a matching circuit.

With this structure, a transmit terminal can be shared. In addition, a transmit amplifier connected to a previous step before the antenna duplexer can be shared, achieving downsizing of communications equipment. Third filter 14 may also be connected only to receive terminal 17 shown in FIG. 1.

If at least one of first filter 12, second filter 13, and third filter 14 is configured with a surface acoustic wave filter, antenna signal losses can be reduced and communications equipment can be downsized.

Figure 5:
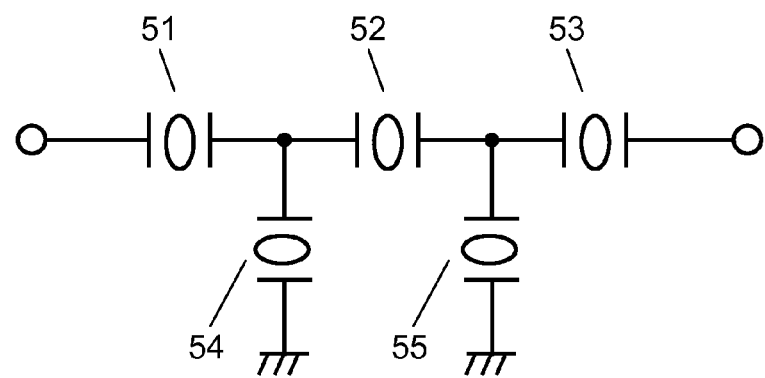
FIG. 5 is a diagram of a ladder-type surface acoustic wave filter in the antenna duplexer in accordance with the first exemplary embodiment of the present invention.

FIG. 5 is a diagram of a ladder-type surface acoustic wave filter of the antenna duplexer in the first exemplary embodiment of the present invention. As shown in FIG. 5, at least one of first filter 12, second filter 13, and third filter 14 is a ladder-type filter in which multiple surface acoustic wave resonators 51, 52, 53, 54, and 55 are disposed and connected in a ladder structure. This reduces antenna signal losses in the antenna duplexer, and downsizes communications equipment. By setting a resonant frequency and anti-resonant frequency and optimally designing a capacity ratio of series resonators and parallel resonators in the ladder-type filter, antenna signal losses can be reduced, and high attenuation of unwanted signals can be achieved.

Figure 6:
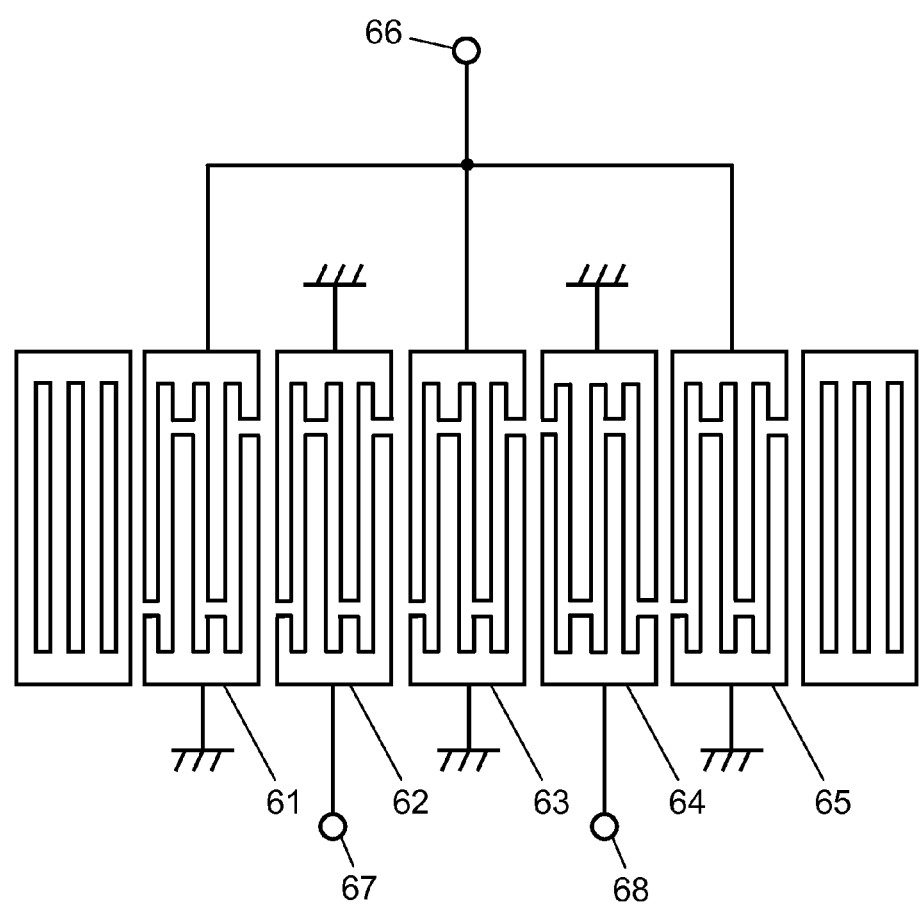
FIG. 6 is a diagram of a longitudinal-mode surface acoustic wave filter in the antenna duplexer in accordance with the first exemplary embodiment of the present invention.

FIG. 6 is a diagram of a longitudinal-mode surface acoustic wave filter of the antenna duplexer in the first exemplary embodiment of the present invention. The longitudinal-mode surface acoustic wave filter is configured by closely disposing multiple comb electrodes 61, 62, 63, 64, and 65 on a piezoelectric substrate, as shown in FIG. 6. The use of this longitudinal-mode surface acoustic wave filter in at least one of first filter 12, second filter 13, and third filter 14 improves attenuation in frequency bands far from a passband of the antenna duplexer, and also suppresses interference. Furthermore, the antenna duplexer with balanced terminal can be achieved by connecting comb electrodes 61, 63, and 65 to unbalanced terminal 66, and connecting comb electrodes 62 and 64 to balanced terminals 67 and 68.

With this structure, a low-noise amplifier with balanced terminal can be connected in a subsequent step after the antenna duplexer, as described above. This improves common-mode noise rejection of communications equipment.

The number of comb electrodes in the longitudinal mode surface acoustic wave filter and its connection configuration are not limited to that shown in FIG. 6. The filter may employ three comb electrodes. Or, the comb electrodes may be combined with a surface acoustic wave resonator. Withstand power characteristic improves by connecting in series the surface acoustic wave resonator to antenna terminal 11 shown in FIG. 3.

Figure 7:
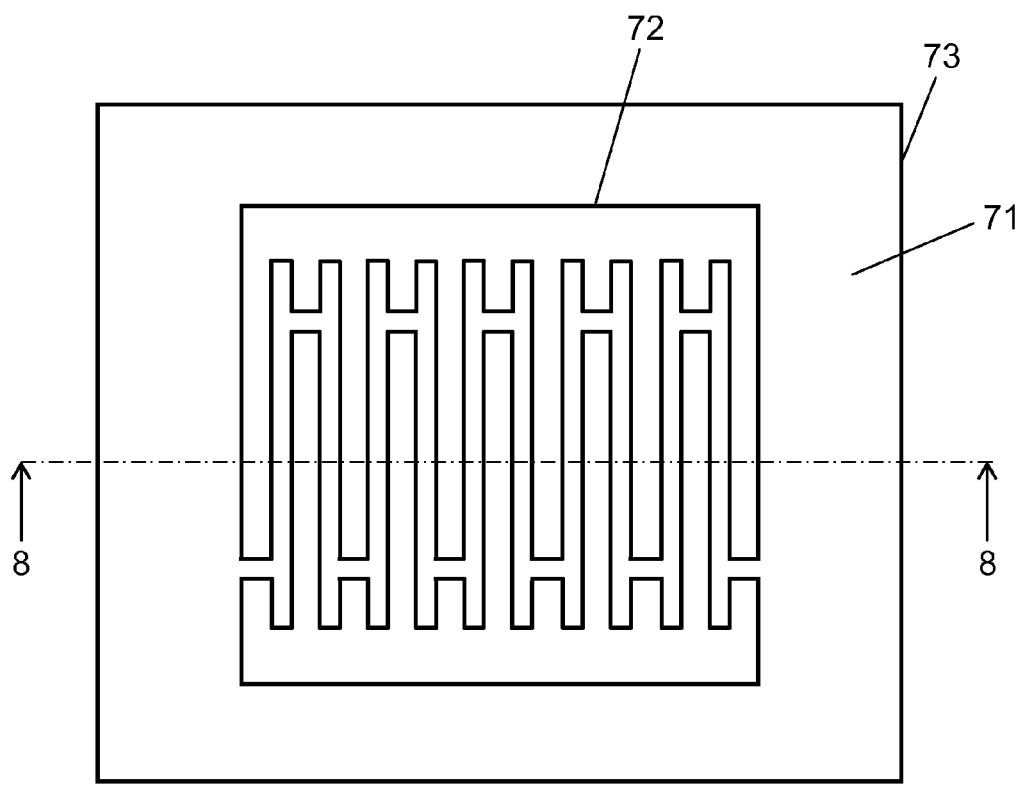
FIG. 7 is a top view of a comb electrode of a surface acoustic wave filter of the antenna duplexer in accordance with the first exemplary embodiment of the present invention.
Figure 8:
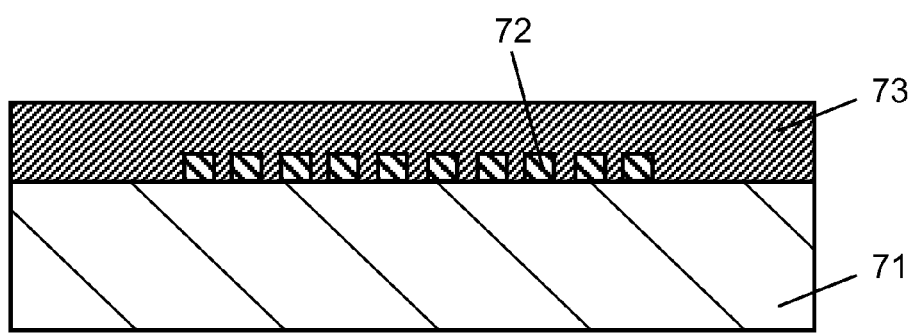
FIG. 8 is a sectional view taken along 8-8 in FIG. 7.

FIG. 7 is a top view of a comb electrode in the surface acoustic wave filter of the antenna duplexer in the first exemplary embodiment of the present invention. FIG. 8 is a sectional view taken along 8-8 in FIG. 7. At least one of first filter 12, second filter 13, and third filter 14 has a filter structure that includes piezoelectric substrate 71 and comb electrode 72 formed on this piezoelectric substrate, as shown in FIGS. 7 and 8. Thin dielectric film 73 is formed on comb electrode 72. A temperature compensation effect is achieved by using a thin $SiO_2$ film as thin dielectric film 73. This improves temperature characteristics of the filter. If a thin silicon nitride film is used as thin dielectric film 73, a passivation effect can be achieved.

If piezoelectric substrate 71 is formed of $LiNbO_3$ and a rotated Y-cut angle of $LiNbO_3$ substrate is from −30° to 30°, resonator characteristics is achieved in a wide band. This enables downsizing of antenna duplexer used for bands in which there is a wide gap between a transmit frequency band and receive frequency band, such as BandI and BandX.

Still more, if the thin dielectric film is mainly made of a thin $SiO_2$ film, and a standardized film thickness is 15% or above (where the standardized film thickness is defined as H/λ, and H is a thickness of the thin dielectric film and λ is a wavelength of a surface acoustic wave in the surface acoustic wave filter), the temperature compensation effect is achieved and filter losses can also be reduced by reducing propagation losses of surface acoustic waves. If the antenna duplexer is configured using aforementioned filter, impedance characteristic of receive frequency band of the transmit filter and impedance characteristic of transmit frequency band of the receive filter can be improved. This reduces losses in the antenna duplexer.

In this exemplary embodiment, the top face of $SiO_2$ is flat. However, by providing convex shape to the top face of $SiO_2$ on IDT electrodes, spurious responses, in particular, spurious responses caused by the Rayleigh mode, can be suppressed. This preferably improves characteristics.

Furthermore, a thin $SiO_2$ film with standardized film thickness of 15% or above may be formed on the comb electrode on the piezoelectric substrate whose rotated Y-cut angle of LiNbO3 substrate is from −30° to +30. This filter structure reduces filter propagation losses, and achieves a surface acoustic wave resonator with electromechanical coupling coefficient higher than that of a conventional $LiTaO_3$ substrate or $LiNbO_3$ substrate whose rotated Y-cut angle is 41° or 64°. Accordingly, a characteristic of a wide gap between passband frequency and attenuation band frequency is easily realized. This is effective for downsizing communications equipment and reducing antenna signal losses in a structure that there is a wide gap between transmit and receive frequencies, such as BandI and BandX.

In the first exemplary embodiment, first filter 12 and second filter 13 are connected to common antenna terminal 11. However, first filter 12 and second filter 13 may be connected to a separate independent transmit and receive terminals, respectively.

Next, characteristics of antenna duplexer in the first exemplary embodiment is described. A filter used in the antenna duplexer is a ladder-type surface acoustic wave filter. A −30° to +30° rotated Y-cut $LiNbO_3$ substrate is used as a piezoelectric substrate in the surface acoustic wave filter. A thin dielectric film mainly made of thin $SiO_2$ film is formed over the comb electrode.

Figure 9:
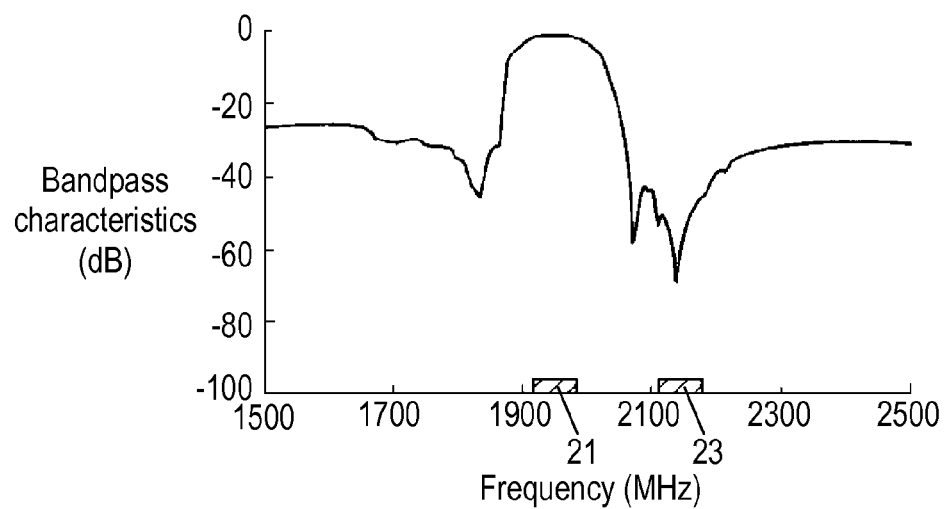
FIG. 9 illustrates bandpass characteristics of a first filter in the antenna duplexer in accordance with the first exemplary embodiment of the present invention.

FIG. 9 illustrates passband characteristics of the first filter of antenna duplexer in the first exemplary embodiment of the present invention. In FIG. 9, BandI has low loss in transmit frequency band 21, and high attenuation in receive frequency band 23.

Figure 10:
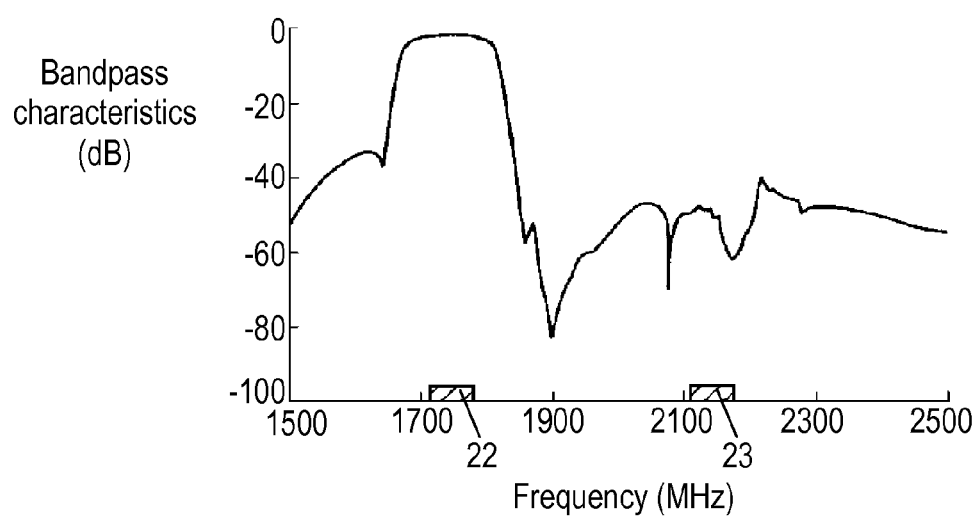
FIG. 10 illustrates bandpass characteristics of a second filter in the antenna duplexer in accordance with the first exemplary embodiment of the present invention.

FIG. 10 illustrates passband characteristics of the second filter of antenna duplexer in the first exemplary embodiment of the present invention. In FIG. 10, BandX has low loss in transmit frequency band 22, and high attenuation in receive frequency band 23.

Figure 11:
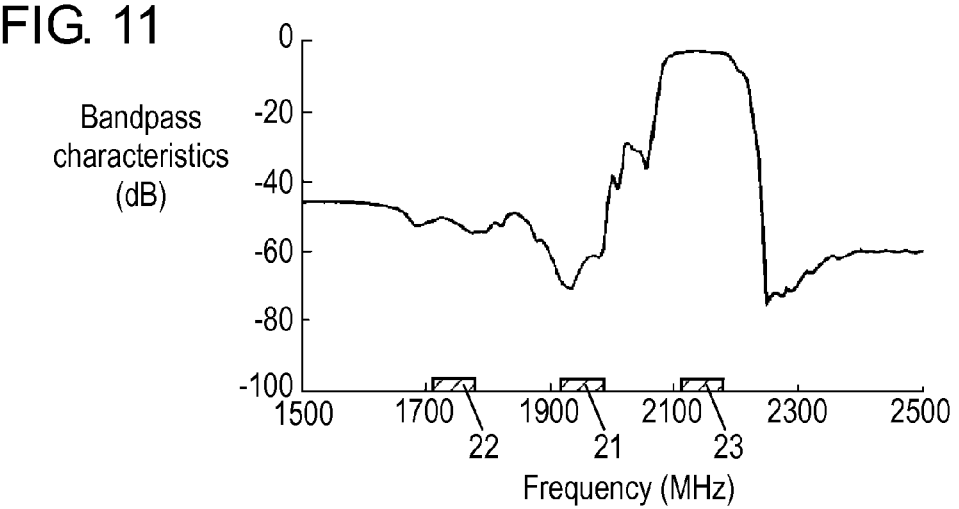
FIG. 11 illustrates bandpass characteristics of a third filter in the antenna duplexer in accordance with the first exemplary embodiment of the present invention.

FIG. 11 illustrates passband characteristics of the third filter of antenna duplexer in the first exemplary embodiment of the present invention. In FIG. 11, transmit frequency band 21 in BandI and transmit frequency band 22 in BandX show high attenuation, and receive frequency band 23 common to BandI and BandX shows low loss.

Figure 12:
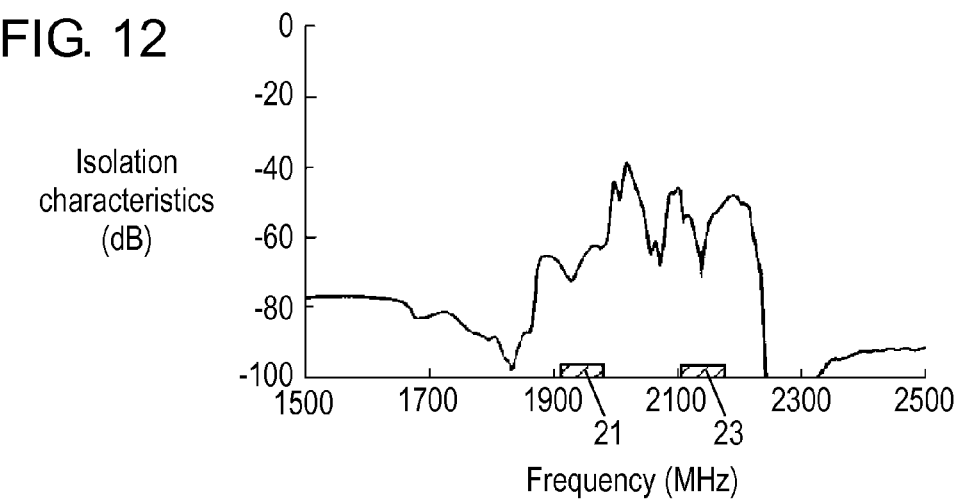
FIG. 12 illustrates isolation characteristics of a transmit terminal and a receive terminal in accordance with the first exemplary embodiment of the present invention.

FIG. 12 illustrates isolation characteristics between transmit terminal 15 and receive terminal 17 in the first exemplary embodiment of the present invention. In FIG. 12, transmit frequency band 21 and receive frequency band 23 in BandI are fully isolated, and thus leakage of signals from transmit terminal 15 to receive terminal 17 can be fully suppressed.

Figure 13:
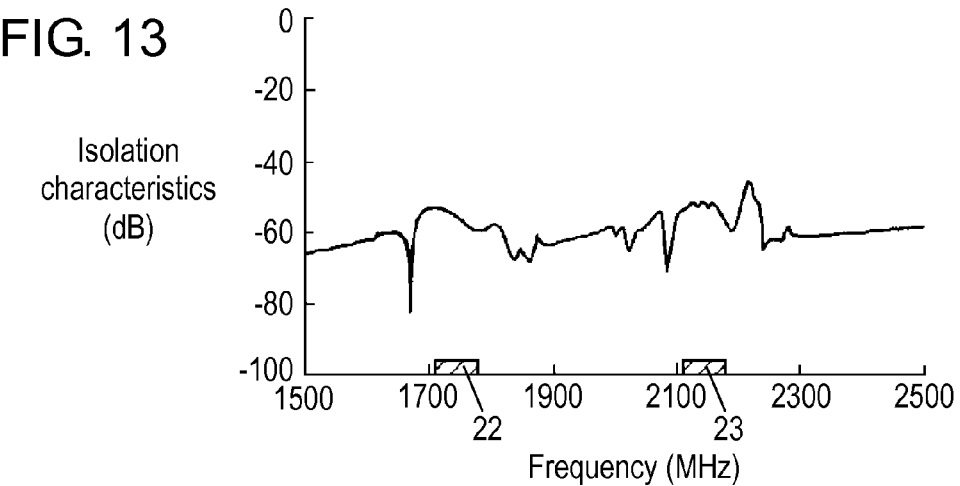
FIG. 13 illustrates isolation characteristics of another transmit terminal and a receive terminal in accordance with the first exemplary embodiment of the present invention.

FIG. 13 illustrates isolation characteristics between transmit terminal 16 and receive terminal 17 in the first exemplary embodiment of the present invention. In FIG. 13, transmit frequency band 22 and receive frequency band 23 in BandX are fully isolated, and thus leakage of signals from transmit terminal 15 to receive terminal 17 can be fully suppressed.

By the use of surface acoustic wave filter, as described above, a small and high-performance antenna duplexer can be achieved.

Figure 14:
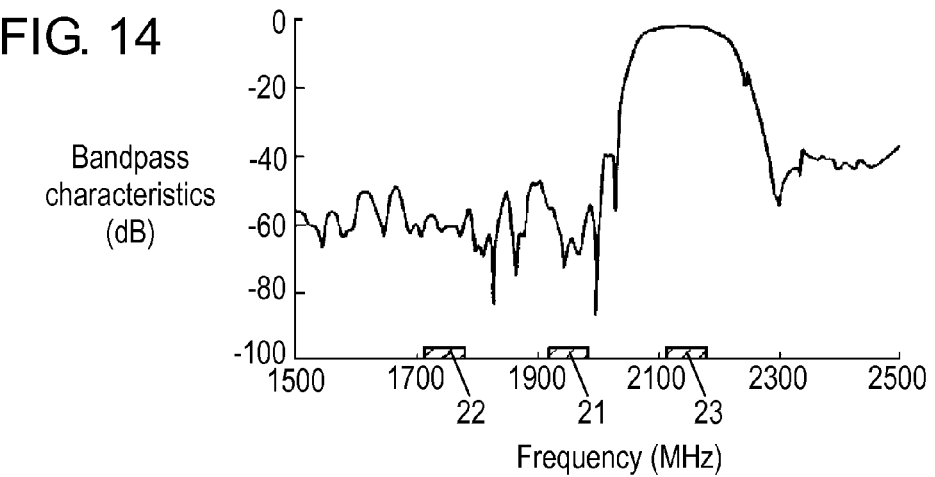
FIG. 14 illustrates bandpass characteristics of another third filter in the antenna duplexer in accordance with the first exemplary embodiment of the present invention.

FIG. 14 illustrates bandpass characteristics of another third filter in the antenna duplexer in the first exemplary embodiment of the present invention. What differs from FIG. 11 is that a longitudinal mode surface acoustic wave filter is used as the third filter. In FIG. 14, transmit frequency band 21 in BandI and transmit frequency band 22 in BandX show high attenuation, and receive frequency band 23 common to BandI and BandX shows low loss. In particular, attenuation in transmit frequency band 22 in BandX is higher than that using the ladder-type surface acoustic wave filter. The longitudinal mode surface acoustic wave filter has an advantage with respect to attenuation in frequency bands far away from the passband. Accordingly, high performance is achievable by applying this longitudinal mode surface acoustic wave filter to the third filter, which is a filter for common frequency band.

Figure 15:
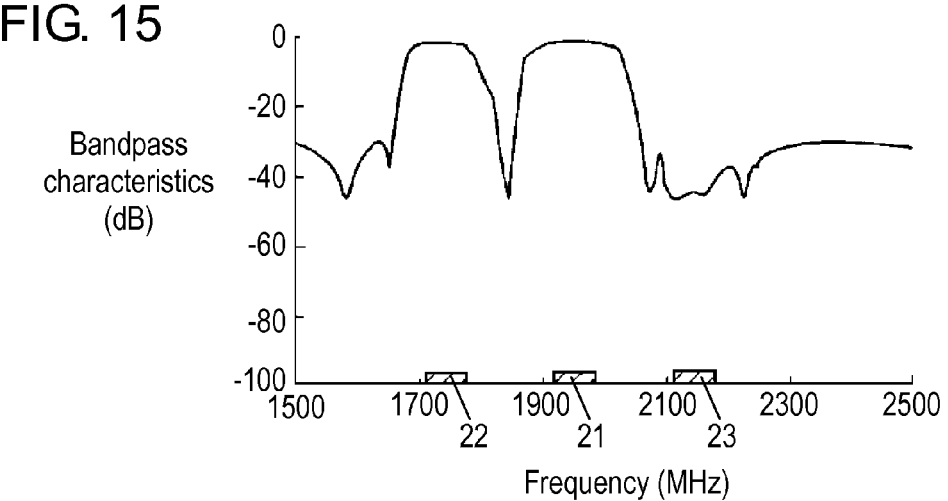
FIG. 15 illustrates bandpass characteristics of an antenna terminal and a transmit terminal in the antenna duplexer shown in FIG. 4 in accordance with the first exemplary embodiment of the present invention.

FIG. 15 illustrates passband characteristics of antenna terminal 11 and transmit terminal 41 of the antenna duplexer in FIG. 4 in the first exemplary embodiment of the present invention. In FIG. 15, transmit frequency band 21 in BandI and transmit frequency band 21 in BandX both show low losses, and receive frequency band 23 shows high attenuation.

Figure 16:
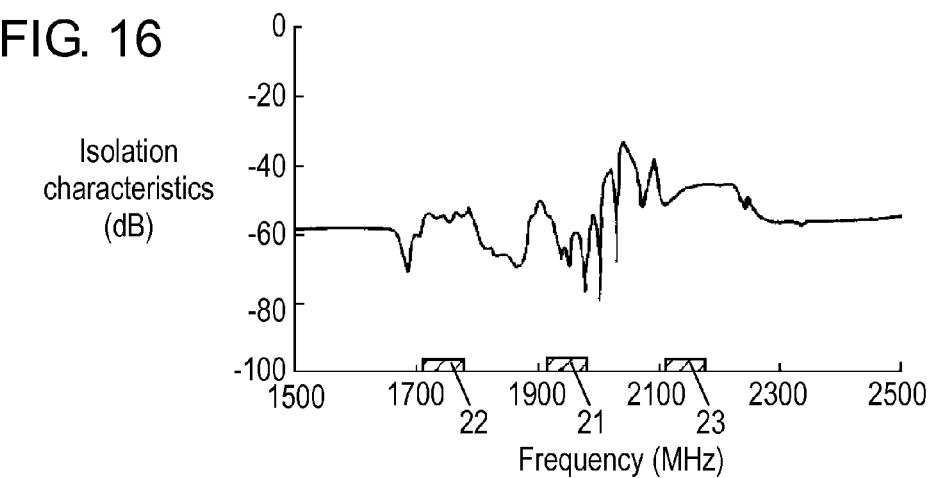
FIG. 16 illustrates isolation characteristics of the transmit terminal and a receive terminal of the antenna duplexer shown in FIG. 4 in accordance with the first exemplary embodiment of the present invention.

FIG. 16 illustrates isolation between transmit terminal 41 and receive terminals 31 and 32 of the antenna duplexer in FIG. 4 in the first exemplary embodiment of the present invention. In FIG. 16, transmit frequency band 21 in BandI, and transmit frequency band 22 and receive frequency band 23 in BandX are fully isolated. Accordingly, leakage of signals from transmit terminal 41 to receive terminals 31 and 32 is fully suppressed.

Next is described an example of applying the antenna duplexer of the present invention to communications equipment.

Figure 17:
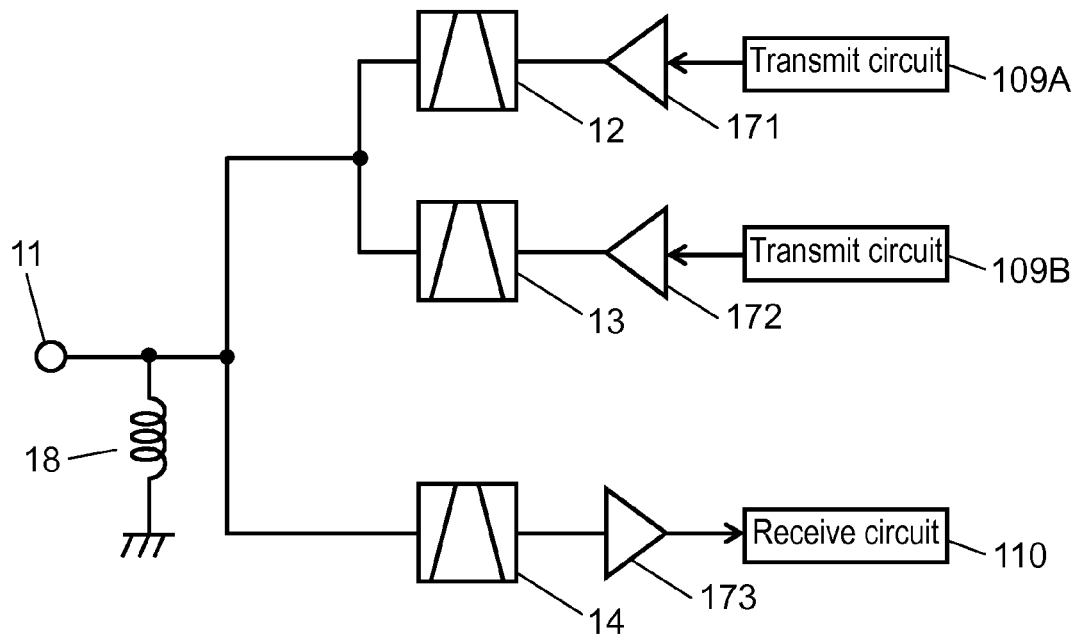
FIG. 17 is a diagram of communications equipment in accordance with the first exemplary embodiment of the present invention.

FIG. 17 is a diagram of communications equipment in the first exemplary embodiment of the present invention. In FIG. 17, first filter 12 is connected to transmit circuit 109A via transmit amplifier 171, second filter 13 is connected to transmit circuit 109B via transmit amplifier 172, and third filter 14 is connected to receive circuit 110 via low-noise amplifier 173.

A transmit signal output from transmit circuit 109A is amplified in transmit amplifier 171, and transmitted to antenna terminal 11 through first filter 12. A transmit signal output from transit circuit 109B is amplified in transmit amplifier 172, and transmitted to antenna terminal 11 through second filter 13. A receive signal input from antenna terminal 11 is amplified in low-noise amplifier 173 through third filter 14, and transmitted to receive circuit 110. Here, the possibility of leakage of transmit signals to receive circuit 110 is extremely low because isolation is fully secured in the antenna duplexer. In addition, since third filter 14 is shared, low-noise amplifier 173 and receive circuit 110 can be shared. Accordingly, communications equipment can be downsized.

Figure 18:
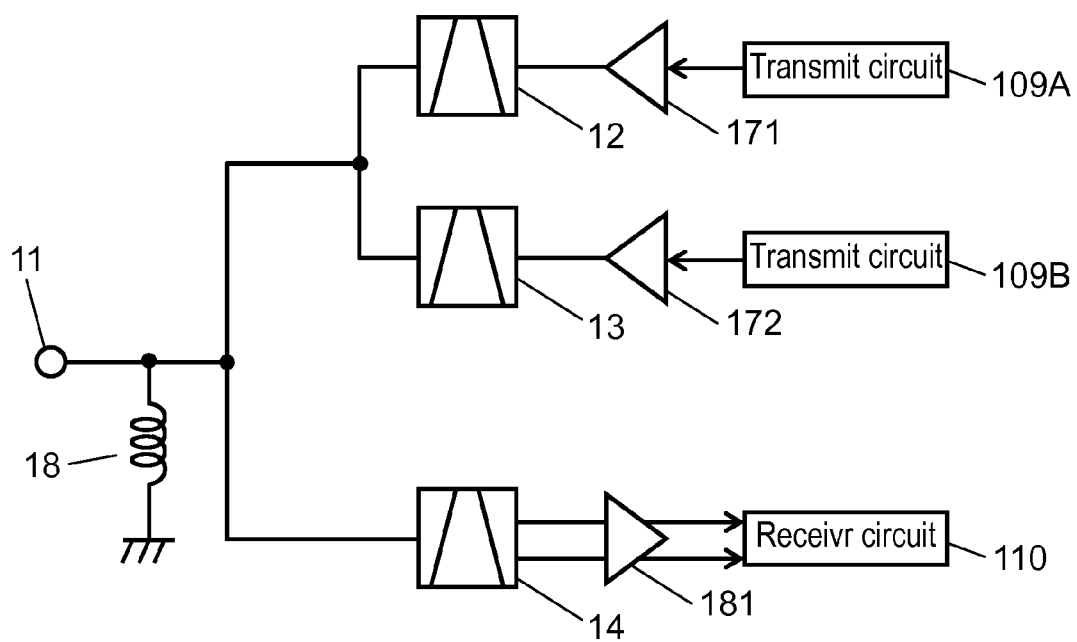
FIG. 18 is a diagram of communications equipment employing the antenna duplexer in FIG. 3 in accordance with the first exemplary embodiment of the present invention.

FIG. 18 is a diagram of the communications equipment employing the antenna duplexer in FIG. 3 in the first exemplary embodiment of the present invention. In FIG. 18, third filter 14 has balanced terminals, and they are connected to balanced low-noise amplifier 181. With this structure, these balanced terminal can be used for low-noise amplifier. Accordingly, common-mode noise rejection of communications equipment can be improved, in addition to downsizing.

Figure 19:
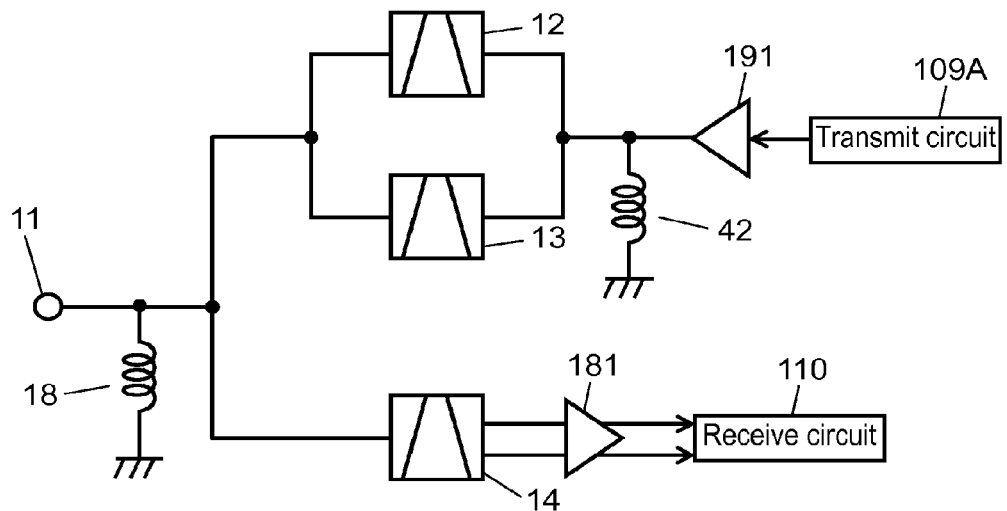
FIG. 19 is a diagram of communications equipment employing the antenna duplexer in FIG. 4 in accordance with the first exemplary embodiment of the present invention.
Figure 19:
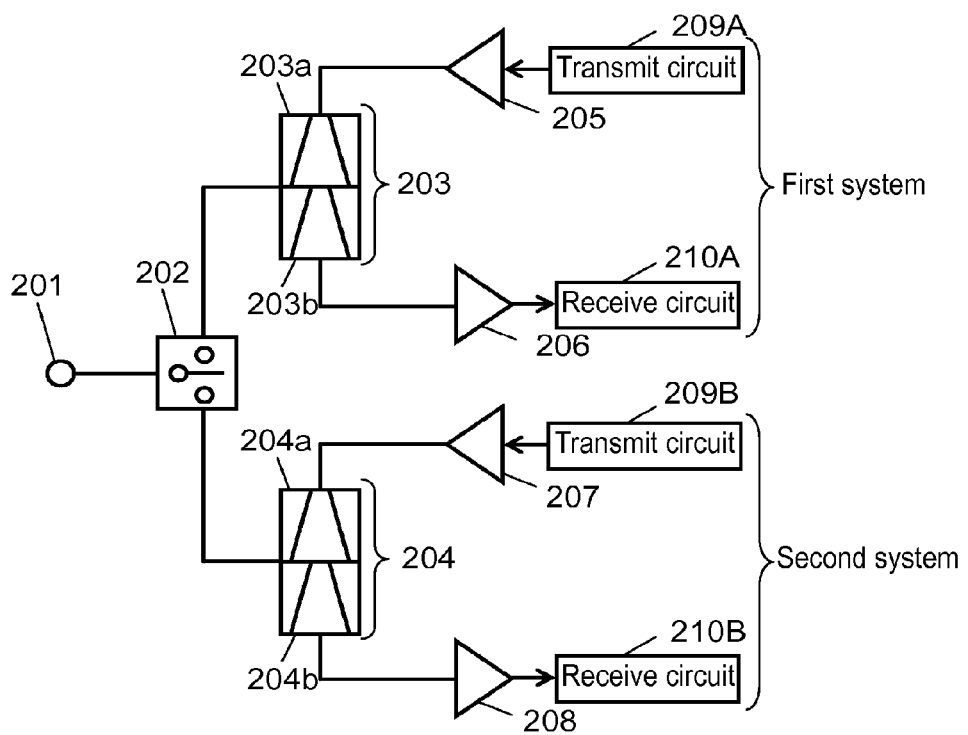

FIG. 19 is a diagram of the communications equipment employing the antenna duplexer in FIG. 4 in the first exemplary embodiment of the present invention. In FIG. 19, the other end of first filter 12 and the other end of second filter 13 are shared and connected to transmit circuit 109A via transmit amplifier 191. If a transmit signal output from transmit circuit 109A is in a transmit frequency band of the first band, this transmit signal is amplified in transmit amplifier 191, and transmitted to antenna terminal 11 through first filter 12. If a transmit signal output from transmit circuit 109A is in a transmit frequency band of the second band, this transmit signal is amplified in transmit amplifier 191, and transmitted to antenna terminal 11 through second filter 13. This structure enables sharing of the transmit amplifier and the transmit circuit, achieving downsizing of communications equipment. Inductors 18 and 42 serving as matching circuits can be eliminated as long as the antenna duplexer works.

If the surface acoustic wave filter is used in first filter 12, second filter 13, and third filter 14, an advantage differs depending on whether these first filter 12, second filter 13, and third filter 14 are formed on the same piezoelectric substrate 71 or formed on separate piezoelectric substrates 71, respectively.

In FIG. 7, if the filters are formed on the same piezoelectric substrate 71, a mounting area can be reduced, contributing to downsizing. On the other hand, if the filters are formed on separate piezoelectric substrates 71, the electrode film thickness of comb electrode can be optimized for a frequency band of each filter, further reducing filter losses.

Accordingly, in case of using BandI and BandIV or BandI and BandX, the first and second filters, which have relatively close frequencies, are formed on the same piezoelectric substrate 71, and the third filter for frequencies far away is formed on different piezoelectric substrate 71. This allows optimal design for each frequency band, and reduction of filter losses.

In case of BandI and BandIV or BandI and BandX, the transmit filter and receive filter for BandI are formed on first piezoelectric substrate 71, and the transmit filter for BandIV or BandX is formed on second piezoelectric substrate 71. The electrode film thickness of transmit filter for BandIV or BandX is made thicker than the electrode film thickness of transmit filter and receive filter for BandI, so as to achieve the optimal condition. This reduces losses in each frequency band. The receive filter for BandI functions as the receive filter for BandVI or BandX, as described in the first exemplary embodiment.

If the surface acoustic wave filter is used, piezoelectric substrate 71 may be placed on either an individual package or the same package. However, placement on individual package is more advantageous with respect to less degradation in isolation due to coupling inside the package. The first exemplary embodiment refers to the use of the surface acoustic wave filter. However, the antenna duplexer can be downsized also by using FBAR (Film Bulk Acoustic Wave) or a boundary acoustic wave device. The boundary acoustic wave device may be configured by forming thin dielectric film 73 shown in FIG. 8 with $SiO_2$, and forming a thin dielectric film, which is made of a material with acoustic velocity higher than that of $SiO_2$ such as SiN and AlN, over this thin dielectric film 73.

The antenna duplexer of the present invention is used in UMTS. However, the present invention is also applicable to other systems.

INDUSTRIAL APPLICABILITY

The antenna duplexer of the present invention can be downsized, and is thus effectively applicable to a range of communications equipment including mobile phones.

The invention claimed is:

1. An antenna duplexer comprising:
   an antenna terminal;
   a first filter electrically connected to the antenna terminal, the first filter passing a first frequency band;
   a second filter electrically connected to the antenna terminal, the second filter passing a second frequency band; and
   a third filter electrically connected to the antenna terminal, the third filter passing a third frequency band,
   wherein the first filter and the third filter are used for a first band, and the second filter and the third filter are used for a second band,
   wherein the first filter and the third filter are formed on a first piezoelectric substrate,
   wherein the second filter is formed on a second piezoelectric substrate separated from the first piezoelectric substrate,
   wherein one end of the first filter and one end of the second filter are connected to a common transmit terminal, and
   wherein the third filter is connected to a receive terminal.

2. The antenna duplexer of claim 1,
   wherein a frequency band of the third filter is common to:
      a receive frequency band in the first band; and
      a receive frequency band in the second band.

3. The antenna duplexer of claim 2,
   wherein the first band is BandI in an UMTS system, and
   wherein the second band is BandX in the UMTS system.

4. The antenna duplexer of claim 3,
   wherein the first filter is a transmit filter used for BandI in the UMTS system,
   wherein the second filter is a transmit filter used for BandX in the UMTS system, and
   wherein the third filter is a receive filter used for BandI and BandX in the UMTS system.

5. The antenna duplexer of claim 2,
   wherein the first band is BandI in an UMTS system, and
   wherein the second band is BandIV in the UMTS system.

6. The antenna duplexer of claim 5,
   wherein the first filter is a transmit filter used for BandI in the UMTS system, wherein the second filter is a transmit filter used for BandIV in the UMTS system, and wherein the third filter is a receive filter used for BandI and BandIV in the UMTS system.

7. The antenna duplexer of claim 1, wherein at least one of the first filter, the second filter, and the third filter is configured with a plurality of surface acoustic wave resonators arranged in a ladder structure.

8. The antenna duplexer of claim 1, wherein at least one of the first filter, the second filter, and the third filter is a longitudinal-mode surface acoustic wave filter, the longitudinal-mode surface acoustic wave filter being configured with a plurality of comb electrodes closely disposed on a corresponding at least one of the first piezoelectric substrate and the second piezoelectric substrate.

9. The antenna duplexer of claim 8, wherein at least one of the first filter, the second filter, and the third filter is a surface acoustic wave filter with a balanced terminal.

10. The antenna duplexer of claim 1, wherein at least one of the first filter, the second filter, and the third filter includes a thin dielectric film formed over a comb electrode included in a surface acoustic wave filter.

11. The antenna duplexer of claim 10, wherein a corresponding at least one of the first piezoelectric substrate and the second piezoelectric substrate is formed using $LiNbO_3$, and wherein a rotated Y-cut angle of the $LiNbO_3$ substrate is from −30° to +30°.

12. The antenna duplexer of claim 10, wherein the thin dielectric film is a thin film mainly made of a thin $SiO_2$ film of which a standardized film thickness is not less than 15%, where the standardized film thickness is defined as $H/\lambda$, and H is a thickness of the thin dielectric film and $\lambda$ is a wavelength of a surface acoustic wave in the surface acoustic wave filter.

13. The antenna duplexer of claim 1, wherein an inductor is electrically connected to the antenna terminal, the inductor serving as a matching circuit.

14. Communications equipment comprising the antenna duplexer of claim 1.

15. An antenna duplexer comprising:

an antenna terminal;

a first filter electrically connected to the antenna terminal, the first filter passing a first frequency band;

a second filter electrically connected to the antenna terminal, the second filter passing a second frequency band; and a third filter electrically connected to the antenna terminal, the third filter passing a third frequency band, wherein the first filter and the third filter are used for a first band, and the second filter and the third filter are used for a second band, wherein the first filter and the third filter are formed on a first piezoelectric substrate, wherein the second filter is formed on a second piezoelectric substrate separated from the first piezoelectric substrate, and wherein the first frequency band is between the second frequency band and the third frequency band, and an interval between the first frequency band and the second frequency band is larger than an interval between the first frequency band and the third frequency band.

* * * * *